(12) United States Patent
McGregor et al.

(10) Patent No.: US 6,954,133 B2
(45) Date of Patent: Oct. 11, 2005

(54) BIO-METRIC SMART CARD, BIO-METRIC SMART CARD READER, AND METHOD OF USE

(76) Inventors: Travis M. McGregor, 2704 Manhattan Ave. - A, Manhattan Beach, CA (US) 90266; Christopher M. McGregor, 1880 Steiner St., #405, San Francisco, CA (US) 94115; D. Scott McGregor, 820 Maple St., White Rock, BC (CA), V4B 4M2

( * ) Notice: Subject to any disclaimer, the term of this patent is extended or adjusted under 35 U.S.C. 154(b) by 522 days.

(21) Appl. No.: 10/040,156

(22) Filed: Dec. 19, 2001

(65) Prior Publication Data

US 2002/0180584 A1 Dec. 5, 2002

Related U.S. Application Data

(63) Continuation-in-part of application No. 09/843,572, filed on Apr. 26, 2001.

(51) Int. Cl.[7] .......................... G05B 19/00; H04Q 9/00; G06F 17/00; G06F 17/60
(52) U.S. Cl. ..................... 340/5.26; 235/375; 705/50
(58) Field of Search ............................. 340/5.22–5.6; 235/375–386; 705/50–80; 382/115–127

(56) References Cited

U.S. PATENT DOCUMENTS

| | | | | |
|---|---|---|---|---|
| 4,614,861 A | * | 9/1986 | Pavlov et al. | 235/380 |
| 5,686,904 A | | 11/1997 | Bruwer | |
| 5,748,737 A | * | 5/1998 | Daggar | 705/41 |
| 5,774,065 A | | 6/1998 | Mabuchi et al. | |
| 6,136,771 A | | 10/2000 | Taylor et al. | |
| 6,547,130 B1 | * | 4/2003 | Shen | 235/380 |

* cited by examiner

*Primary Examiner*—Michael Horabik
*Assistant Examiner*—Scott Au
(74) *Attorney, Agent, or Firm*—C. Bart Sullivan

(57) ABSTRACT

A system for increasing transaction security across existing infrastructure is provided. A user bio-metric sensor device is integrated into a credit or debit card. A display unit provides a key, preferably encrypted, upon successful utilization of the sensor device. Included in the key generation mechanism is an indicator of the transaction number or other sequential count indicative of card use. An authorization service decrypts the key in a manner at least partially dependent upon a second sequential count maintained in sync with the first count to determine whether the use is authorized. In one embodiment, a separate credit card reader may be configured to read conventional credit cards, smart cards, and credit cards incorporating such bio-metric sensor devices.

6 Claims, 14 Drawing Sheets

BIO-METRIC SMART CARD, BIO-METRIC SMART CARD READER, AND METHOD OF USE

CROSS REFERENCE TO A RELATED APPLICATION AND CLAIM OF PRIORITY

This invention is a continuation in part and claims priority to the following co-pending U.S. patent application, which is incorporated herein by reference in its entirety:

McGregor et al, application Ser. No. 09/843,572, entitled "A BIO-METRIC SMART CARD, BIO-METRIC SMART CARD READER, AND METHOD OF USE," filed, 26, Apr. 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to the field of credit card security, and more particularly to a bio-metric smart card, a bio-metric smart card reader and a method of use for the card and reader.

2. Description of the Related Art

Recent innovations have brought significant security-related advances to the credit card, debit card, and consumer banking industries. In the 1980s, holographic images were introduced and included on plastic card faces to deter the manufacture of counterfeit cards. More recently, some cards have been adapted to include a photograph of the authorized user, thereby obviating the need for a purchaser to present separate identification and decreasing the likelihood of fraud. Most recently, smart cards, also known as personal data cards or chip cards, which include a memory chip integral with the card, now provide additional security features.

Despite these advances, the industry remains burdened by a considerable fraud problem. Credit card theft and fraud accounts for billions of dollars in damages a year in the U.S. alone, with billions more being lost overseas. Holographic images do nothing to deter the unauthorized use of a genuine card and new technology has made them easier to copy. Sub-thumbnail sized photos on cards are often too small for careful examination by store clerks, and like holograms, cannot be viewed during online or telephone-based transactions. And smart cards provide no new security features unless used across a new breed of card-reading infrastructure, which will cost hundreds of millions of dollars to install. Moreover, like the other new technologies described above, smart cards do not address online and telephonic sales scenarios wherein the merchant lacks the ability to examine the actual card. Perhaps most importantly, since smart cards are not compatible with the existing card-reading infrastructure they do not address the near term needs of the industry and the massive on-going losses caused by fraudulent use.

Referring to FIG. 1, there is illustrated an available system 100 for credit card processing. On a credit or debit card 110 there is permanently displayed on a front face surface 112 a multi-(typically sixteen) digit number representative of the card holder's debit or credit account. Also displayed on the surface 112 are the expiration date and card holder's name. A magnetic strip (not shown) is typically found on the back surface of card 110 and contains at least the information displayed on the front surface 112. To process a transaction using the card 110, a seller might use a magnetic strip reader 120 (such as available from Magtec, Inc.) by sliding the upper portion of card 110 through slot 122 to read the information stored within the magnetic strip. After the information is forwarded across network 125 to a financial institution or credit card authorization service, along with data about the requested transaction, a returned authorization number or denial message is displayed across display area 124. In the alternative, the user might read aloud over a telephone connection or otherwise transmit the account number, name and expiration information to a seller, who requests a transaction authorization from a central transaction authority across network 125.

In the above-described available transaction process, while recent security advances do provide some crime protection, there is still far more opportunity than desirable for deception and fraud. Specifically, if the card is lost or stolen the thief or finder of the lost card might use the card for fraudulent purchases. Also, if a thief finds or steals a receipt or similar record listing the card number and other card information found in field 112, that information might be fraudulently used for online or telephonic transactions.

There is therefore a need in the art for a new fraud-preventive system and method, which is compatible with the existing infrastructure, and can be used securely for remote, telephonic, or Internet-based transactions.

SUMMARY OF THE INVENTION

In general, the present invention is a system for increasing transaction security across existing credit card processing infrastructure. A user bio-metric sensor device is integrated into a credit or debit "smart card". A display unit provides a key, preferably encrypted, upon successful utilization of the sensor device. Included in the key generation mechanism is an indicator of the transaction number or other sequential count indicative of card use. An authorization service decrypts the key in a manner at least partially dependent upon a second sequential count maintained in sync with the first count to determine whether the use is authorized. A separate reader may be similarly configured to read existing smart cards utilizing the process the present invention.

More specifically, the present invention may be embodied in a device for preventing the unauthorized use of proprietary data, the apparatus comprising, a user authentication device configured to provide the user an authentication data input for proving the user is authorized to use the account number, a transaction counting mechanism configured to track authorized device access events, a processor device in electrical communication with the user authenticator and counter, the processor being programmed to generate a security key in response to authentication data received via the user authenticator, the security key being derived at least in part from the contents of the counter, and a display unit configured to display the security key on the apparatus.

In one embodiment, the present invention is a smart card style apparatus including a PIN entry system providing the user ability to enter a PIN to authenticate the user, a transaction counter for tracking authorized device access events, a processor in electrical communication with the user authenticator and counter, wherein the processor is programmed to generate a security key in response to the PIN or other authentication data, and a display unit to display the security key on the face of the card. The security key is derived at least in part from the contents of the counter and a clocking mechanism. In another embodiment, the present invention is configured as a portable reader for reading and authorizing purchases using existing smart cards. The present invention may also be configured as a peripheral device to a computer system.

In another embodiment, the present invention is a smart card, comprising, an activation device configured to produce a signal in response to a user action, a display mechanism, a processing device coupled to the display device and configured to receive said signal, and programming executed by the processing device, said programming configured to produce an encrypted key and display the encrypted key on the display mechanism.

The present invention includes a system for securely processing transactions, the system comprising, a security key device, comprising, a user authenticator configured to provide a user an authentication data input for proving the user is authorized to use an account associated with the security device, a first counter in communication with the user authenticator, a key generator in communication with the user authenticator and first counter, the key generator being programmed to generate a security key in response to authentication data received via the user authenticator, the security key being derived at least in part from the content of the first counter, and an electronic display in electrical communication with the key generator, for displaying the security key in a manner visible upon the structure, and an authorization device, comprising, a second counter, and a key confirmation processor programmed to confirm an authenticity of the key in a manner at least partially dependent upon the contents of the second counter.

According to the present invention, a method of securely authorizing a transaction utilizing an account comprises confirming an authorized use of an account card via a PIN provided by a user, maintaining a first count indicative of a number of instances of such authorized uses, generating a security key in a manner at least partially dependent upon the count, transmitting the security key to an authorizing authority, processing the security key at the authorizing authority, maintaining a second count indicative of a number of transmissions received by the authorizing authority for the account, confirming that the security key was generated by an authorized user at least in part through use of the first count and the second count, and authorizing the transaction if the security key was generated by a valid user.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a bio-metric smart card, bio-metric smart card reader and method of use. Any and all such modifications, equivalents and alternatives are intended to fall within the spirit and scope of the present invention.

Figure 1:
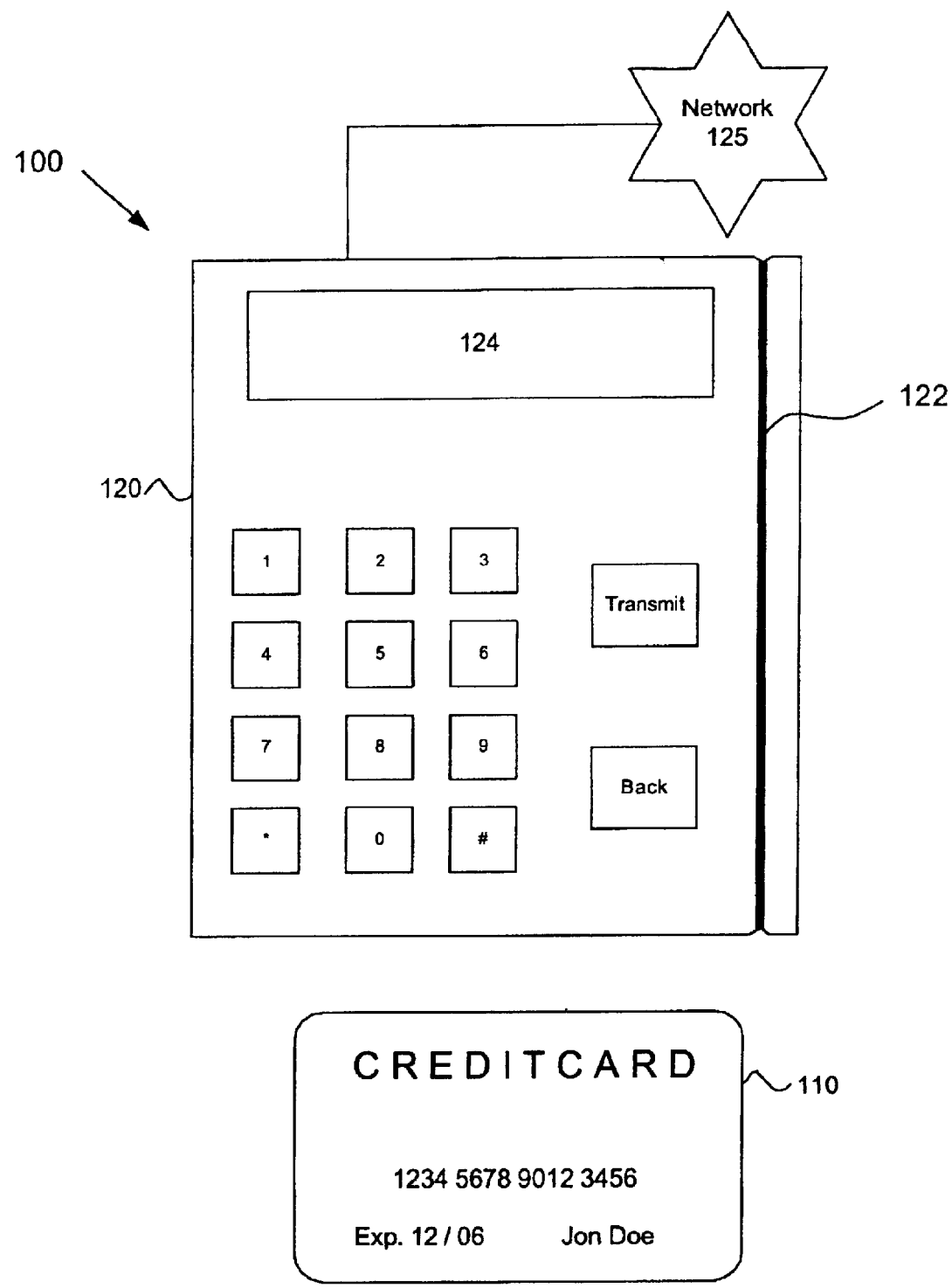
FIG. 1 is a block diagram illustrating an available credit card and transaction processing system.
Figure 2:
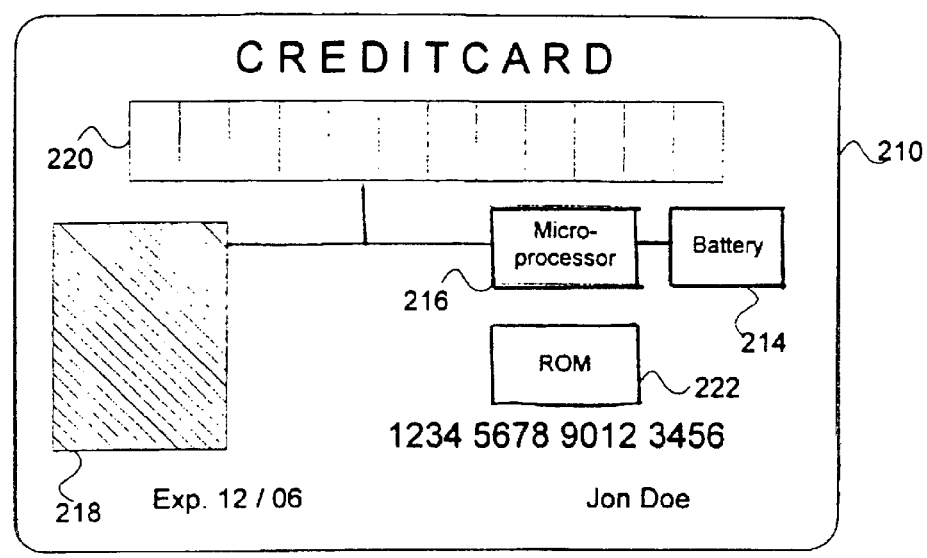
FIG. 2 is a diagram of one embodiment of the present invention.

One embodiment of the present invention is illustrated in FIG. 2. In this embodiment a bio-metric smart card 210 is shown. The bio-metric smart card 210 preferably has substantially the same shape and form factor as available plastic credit and debit cards such as card 110 in FIG. 1, although card 210 might be thicker as needed to accommodate newly-introduced internal components. On a front surface 212 of the card 210, in addition to the account number, name and expiration date display area, there is also preferably provided a bio-metric reading apparatus such as fingerprint scanner 218 in electrical communication with a microprocessor 216. A ROM 222, preferably an EEPROM, stores the fingerprint or other bio-metric data, the encryption keys, and a transaction counter. A battery 214 is connected to provide power to microprocessor 216, preferably within card 210. In the alternative, the energy needed to run microprocessor 216 might be provided through movement of card 210 (as with an automatic watch) or contact of the card or reading apparatus by the user's finger. The finger print scanner 218 is accessibly disposed upon surface 212 of card 210 and connected to microprocessor 216 to provide an input signal triggered by the user placing a thumb or finger upon the surface of scanner 218. For additional information on available technology compatible with the intended use of scanner 218, the reader is referred to U.S. Pat. No. 5,623,552, entitled SELF-AUTHENTICATION IDENTIFICATION CARD WITH FINGERPRINT IDENTIFICATION which is incorporated herein by reference.

A security key display 220 is configured to display dynamic numeric and/or textual data forwarded by microprocessor 216, and intended to accompany the account number for all transactions in the manner outlined below with reference to FIG. 3.

In a manner of use of the bio-metric smart card 210 and the present invention, a user's bio-metric indicator (here, a thumb or finger print) or another user-derived input mechanism triggers in microprocessor 216 the generation of a dynamic security key code displayed in the security key display region 220. The display region 220 preferably comprises an LED array, LCD, or other similar, low-cost display mechanism. The displayed security key is then communicated or transmitted to the credit card authorization service either through a reader, or through a telephone or other remote connection (e.g., entry by the user in a web page interface for an online transaction). The security key display region 220 is configured to display dynamic numeric and/or textual data forwarded by microprocessor 216.

Figure 3:
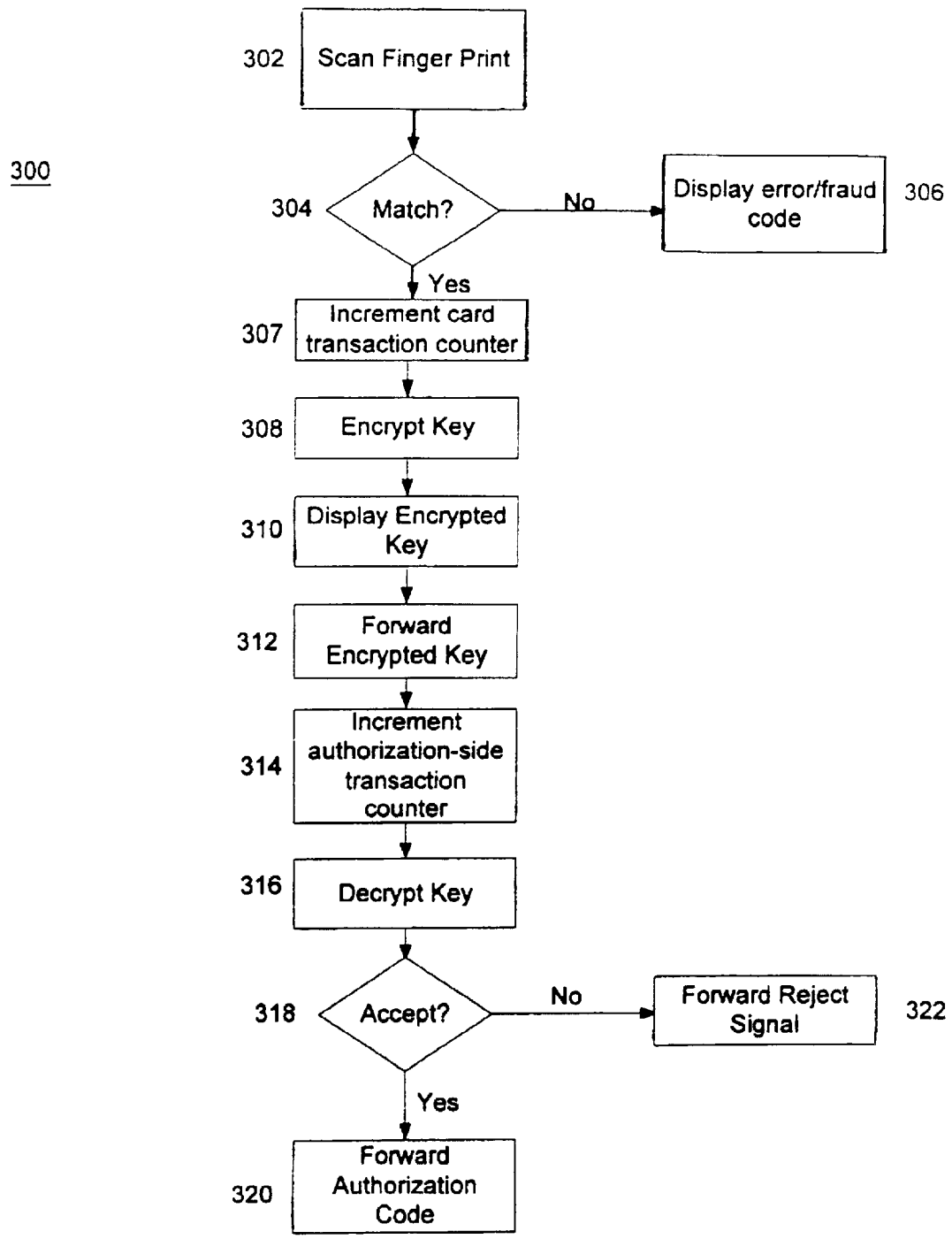
FIG. 3 is a flow-chart illustrating the operation of the present system.

More particularly, referring generally to the flowchart of FIG. 3, at step 302 the user places his or her thumb or finger upon fingerprint scanner 218. In the alternative, step 302 might be replaced with any other form of bio-metric authentication that provides positive identification that an authorized user is, in fact, attempting to use the account number found on the card. The results of scan step 302 are then compared (either by scanner 218 alone or in cooperation with microprocessor 216) at step 304 to a reference file representative of the user's actual print. The reference file might be stored in scanner 218, in microprocessor 216, or in a separate memory unit (ROM 222). If no match is found, an error message or other message indicating an attempted use by other than the authorized user is forwarded at step 306 to display 220. The displayed error code might indicate to the user that an error has been detected with an easily discernable message such as "ERR," or might make such a message recognizable only to the seller, bank or authorization service to better provide an opportunity to recapture a stolen card or detain an unauthorized user (e.g., a non-authentic value that looks like an authentic encrypted key).

If a match is found at step 304, the microprocessor 216 increments an activation/transaction counter at step 307 and generates therewith a numeric or alphanumeric security key. The alphanumeric security key is then preferably encrypted at step 308 and forwarded at step 310 to display 220. The operator of a card reader such as magnetic strip reader 120, or a remote seller communicating with the user, then inputs or forwards at step 312 the displayed, encrypted security key along with the other information found on surface 212 and any other required information.

Upon receipt of the card information and encrypted key at an authorization service center, an authorization-side activation counter is then incremented at step 314, thereby remaining synchronized to the activation counter of the bio-metric smart card 210. The key is then decrypted at steps 316 in a manner utilizing the incremented activation count to determine at step 318 whether the authorized user initiated the requested purchase authorization. If the activation counter is sufficiently aligned with the counter reading from the card (within an allowed "window" of transaction counter numbers to allow for transactions being processed slightly out of order) and other easily understood criteria are met (i.e., sufficient credit or funds available, no lost or stolen card alert reported), an authorization signal is returned across network 125 at step 320. If any of the new or available criteria are not met, a "transaction rejected" code or signal is returned at step 322.

Figure 4:
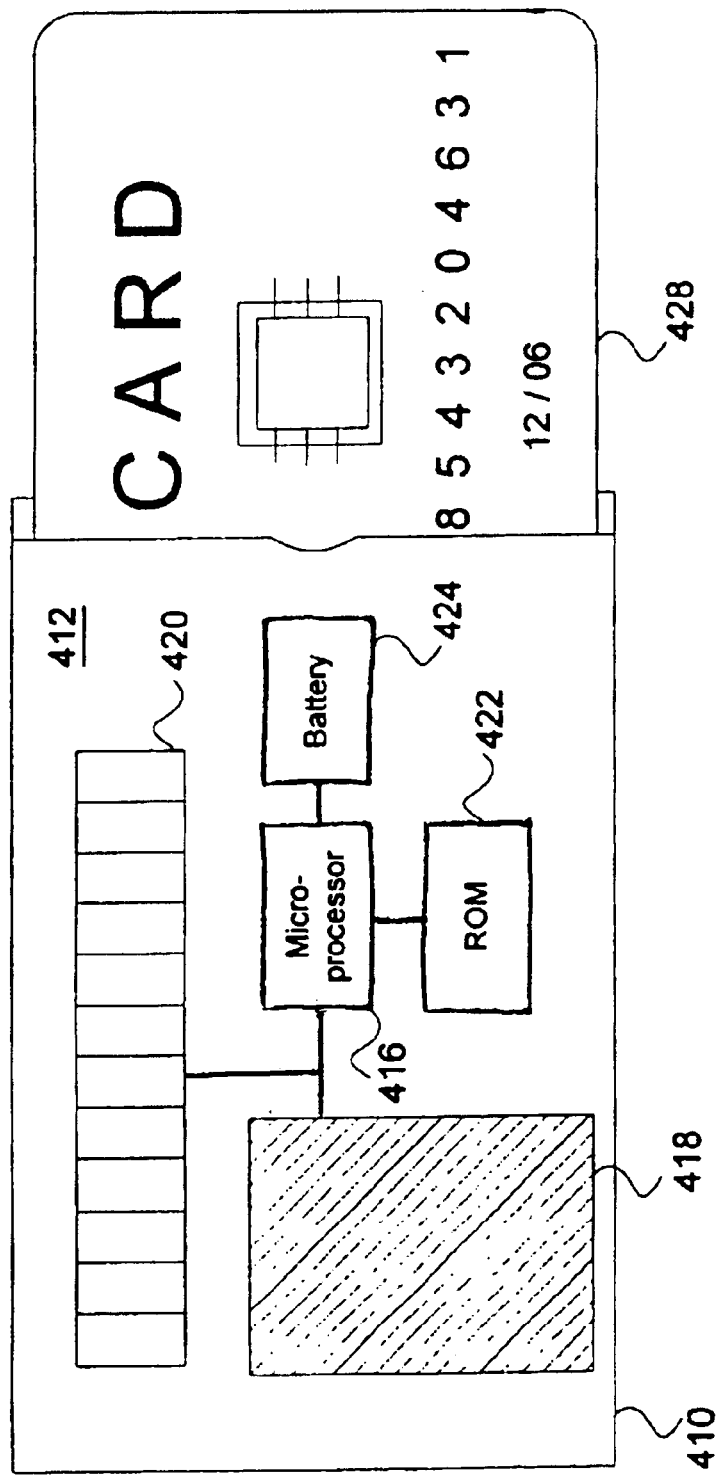
FIG. 4 is a diagram of an alternate embodiment of the present invention.

Referring next to FIG. 4, one embodiment of the inventive card reader 410 is illustrated. The card reader 410 preferably has substantially the same shape and form factor as available plastic credit and debit cards such as card 110 in FIG. 1, although it is generally thicker to accommodate the additional components. The card reader 410 may be formed as a "wallet" such that a smart card 428 can be inserted into the reader as shown in FIG. 4. On the front surface 412, there is preferably provided a bio-metric reading apparatus such as fingerprint scanner 418 in electrical communication with a microprocessor 416. A ROM 422, preferably an EEPROM, stores the fingerprint or other bio-metric data, the encryption keys, and a transaction counter. A battery may also be connected to provide power to microprocessor 416. In the alternative, the energy needed to run microprocessor 416 might be provided through movement of card reader 410 (as with an automatic watch) or contact of the card or by a solar panel. The card reader 410 further includes an alphanumeric display, such as an LED or LCD display 420.

Finger print scanner 418 is accessibly disposed upon surface 412 of the card reader 410 and is connected to the microprocessor 416 to provide an input signal triggered by the user placing a thumb or finger upon the surface of the scanner 418. The display 420 is configured to display dynamic numeric and/or textual data forwarded by microprocessor 416, and is intended to accompany the account number for all transactions in the manner outlined above with reference to FIG. 3. The wallet may include an IR or wireless transmitter to automatically transmit the security code to a transaction network. Thus, the present bio-metric reader ("wallet") may be used with existing smart cards, which lack an incorporated microprocessor and/or display.

Figure 5:
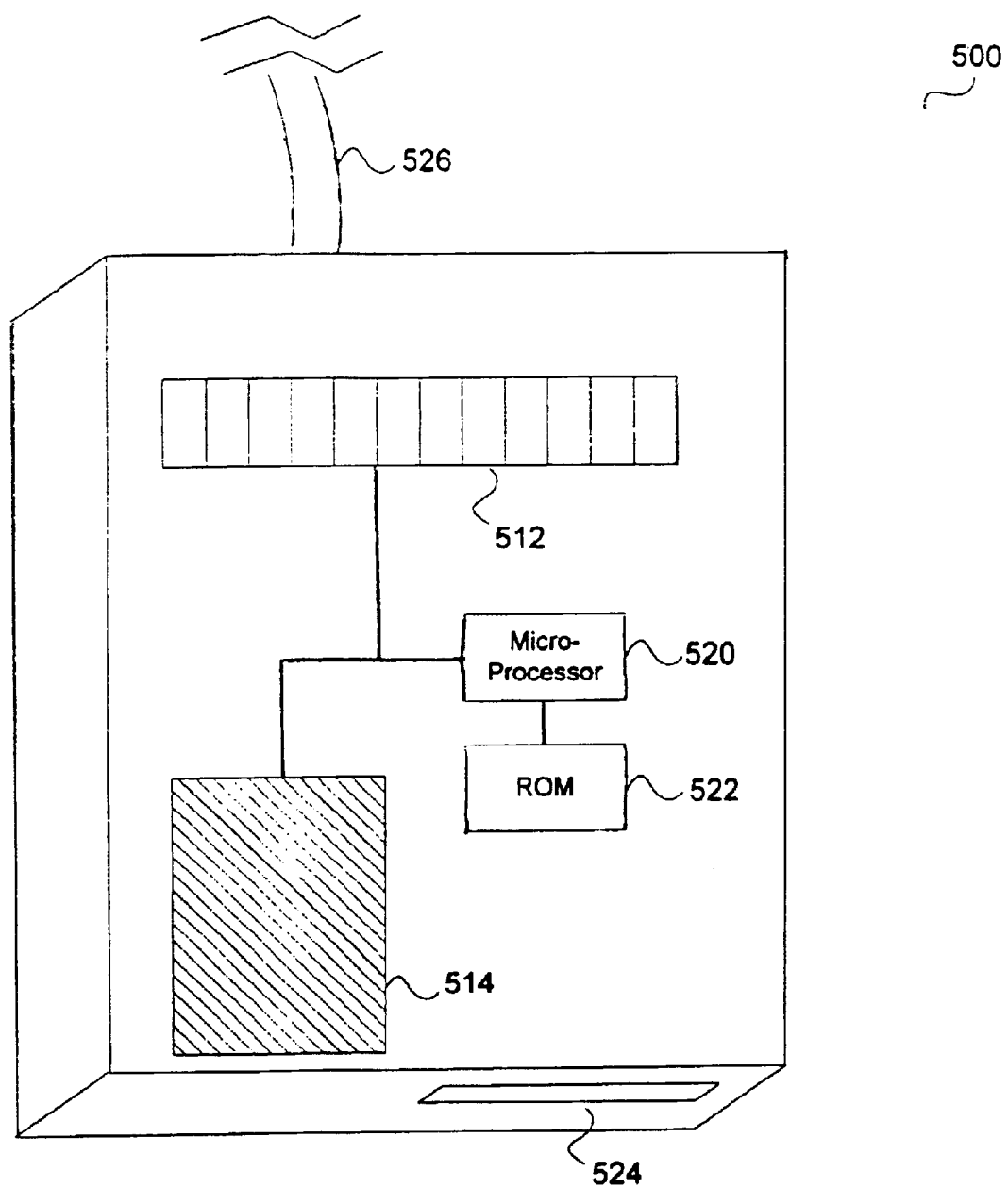
FIG. 5 is a diagram of an alternate embodiment of the present invention.

As shown in FIG. 5, the present invention may be configured in an alternative embodiment as a traditional credit card reader 500 for attachment to a computer or point-of-sale (POS) device, such as an electronic cash register. The card reader includes a microprocessor 520, a display 512, and a bio-metric sensor 514. It also further includes an electrical connection 526 for transferring the security code directly from the reader 500 to the POS device or computer.

Figure 6:
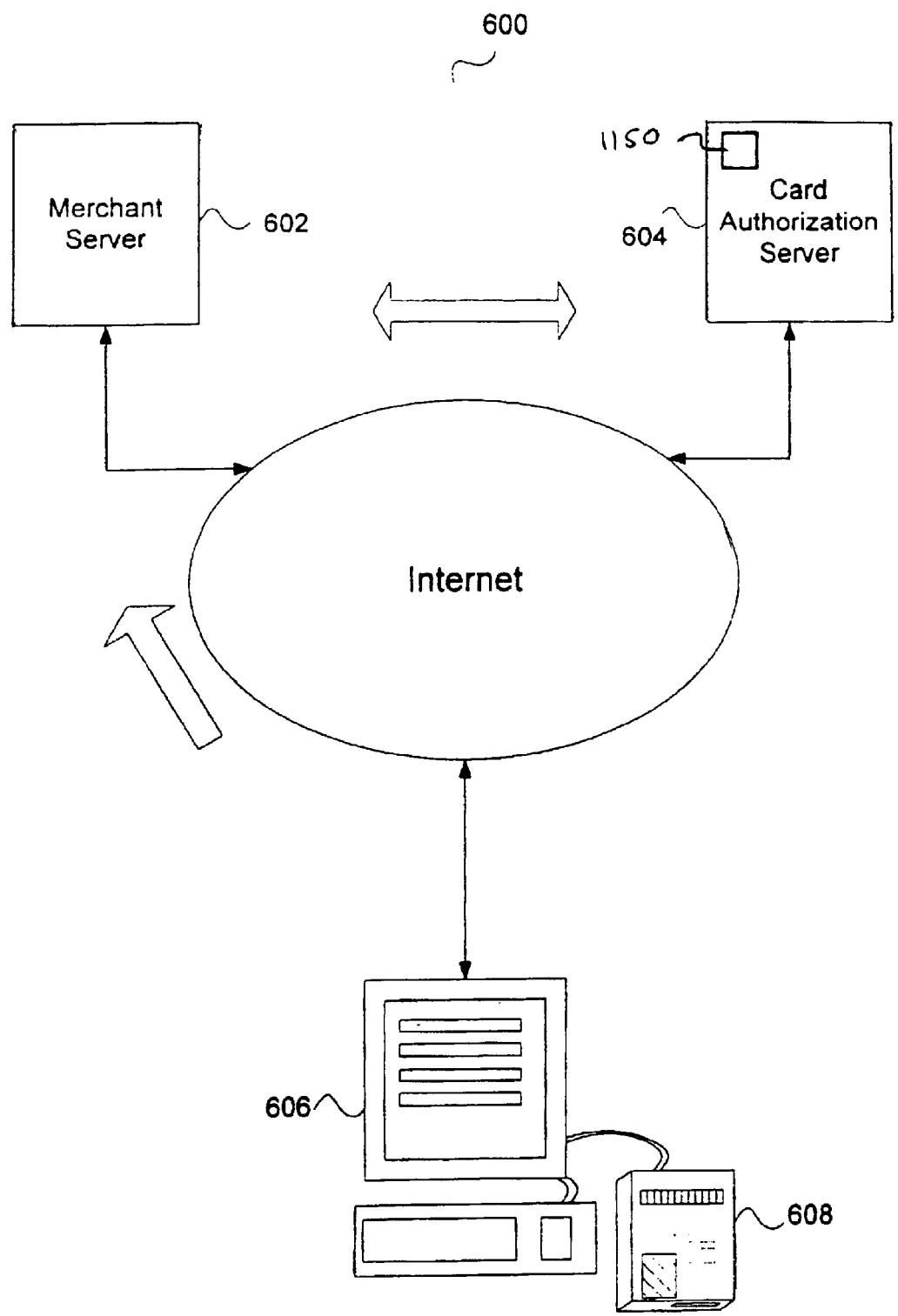
FIG. 6 is diagram illustrating the use of the present invention for purchasing goods over the Internet.

In operation, a user inserts a credit card or smart card into the reader. Once the user places an appropriate finger or thumb on the finger-print sensor 514, the security code is generated by the microprocessor 520 and is displayed on the card reader display 512 or electronically transferred to a network. This security code may then be used to authorize a transaction as described above. FIG. 6 illustrates a system for incorporating the present invention for use in purchasing goods over the Internet. A merchant server 602 forwards the security key transmitted by the reader 608 to an authorization server 604. If the authorization server 604 validates the transaction, the merchant server 602 then processes the purchase request.

As described herein, the present invention provides a greater level of security to credit card transactions, by requiring a bio-metric input, and further by producing a unique security key code for each transaction. The present invention may be incorporated into a new smart card design, including a bio-metric sensor and a display, or may be incorporated as a portable "wallet" that can also be used with standard credit cards.

A preferred method to perform the operation of the encryption and decryption processing will now be discussed in further detail. Other procedures or algorithms may also be used in the present invention, as in well known in the art. First, the following acronyms will be defined:

| | |
|---|---|
| KCARD | Cryptographic key embedded into the bio-metric smart card |
| KDOMAIN | Cryptographic key that resides at the domain company |
| SHA | Secure Hash Algorithm |
| BSEED | Bio-metric encryption seed |
| MD2 | Message Digest Algorithm |
| DES | Data Encryption Standard |

As described above, the purpose of the bio-metric smart card is to authenticate the subscriber and the transaction for a credit card purchase. In order to perform the authentication, each bio-metric smart card contains a unique cryptographic key, KCARD, which is 80 bits or 10 bytes in length. Each service provider also has a unique key, KDOMAIN, which is 80 bits or 10 bytes.
KCARD is derived cryptographically from KDOMAIN respectively as follows:

KCARD=left-hand 10 bytes of SHA (KDOMAIN||BSEED)

where as KCARD is equal to the left-hand 80 bits or 10 bytes of the appropriate SHA result. BSEED is a bio-metrically generated value that is 80 bits or 10 bytes in length for each subscriber. In a preferred embodiment, the BSEED value is generated from a user's fingerprint data. The Secure Hash Algorithm, SHA, is defined in the Federal Information Processing Standards publications 180-1, herein incorporated by reference. KDOMAIN is a random value that is set by the service provider.

The authentication message is encrypted data that is communicated from the bio-metric smart card to the service provider for the purpose of authenticating the subscriber and the transaction. The bio-metric smart card communicates this message via the display on the front of the card, or the data is directly sent via IR or other wireless technology, or by a smart card reader that has an electrical connection to the network. The authentication message is comprised of base 10 values so that it will support most current infrastructures (i.e. telephone, Internet, zone machines, etc.). This message is also cryptographically designed so that the number of digits in the message will comply with industries standards (i.e. Visa, MasterCard, Amex, AT&T, MCI, etc.).

As discussed above, the authentication message contains a transaction (serial) number that is incremented for each transaction. This transaction number is incremented for each transaction so that it will only be accepted once. The transaction number is initially set to zero and when it reaches the value of 999999 the card becomes inoperable, or the transaction number is reset.

The bio-metric smart card increments the transaction number stored in the EEPROM of the card for each authentication message. The authentication message is encrypted using the KCARD encryption key and using the MD2 or DES encryption algorithm. This method allows for each authentication message to be unique for each subscriber and for each transaction. For example, performing MD2 (KCARD+transaction number) produces a unique base 10 number. The next transaction increments the transaction number by 1, and thereby produces a different base 10 number, which is not simply the first security code plus one.

This provides increased security against fraud, since even if someone has access to one security code, this will not authorize future transactions.

The authentication message is decrypted using the KCARD key and the MD2 or DES algorithm. The decryption key KCARD is generated for each transaction, so that there is no need for transferring this data. The transaction number contained in the authentication message is then referenced to validate the transaction. This is to prevent duplicate transactions. The authentication server may use a transaction number "window" to authorize each transaction in order to accommodate transactions being processed out of order. For example, transactions that are plus five transaction numbers from the current count may be approved.

The smart card or wallet incorporating the present invention must be initialized prior to use in order to store the KDOMAIN value and the user's fingerprint data. This step may be performed at a user's local bank branch, as is currently done to initialize ATM PIN numbers.

Figure 7:
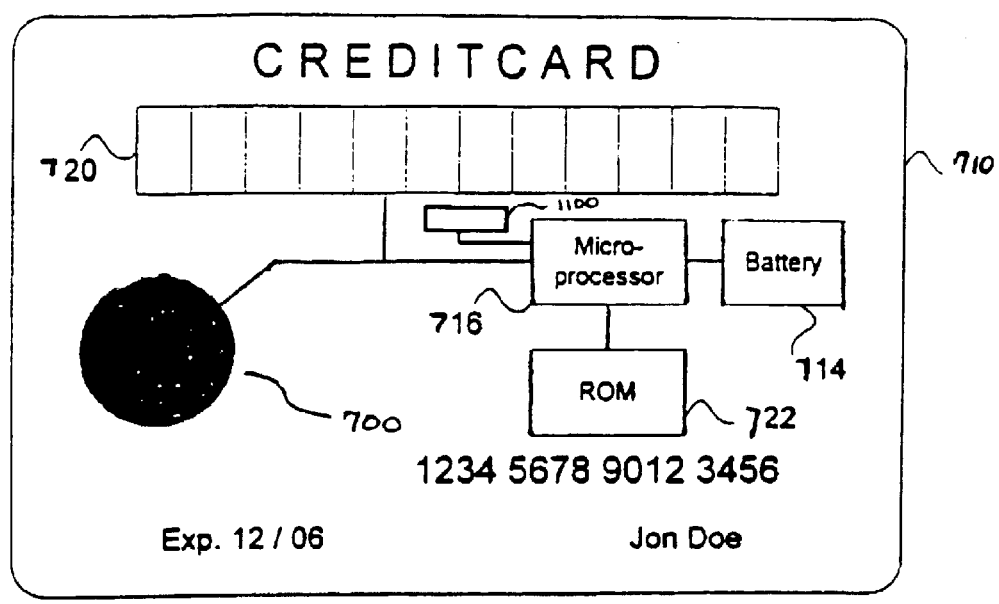
FIG. 7 is a diagram of another embodiment of the present invention using a button for activation of an encrypted key.

FIG. 7 is a diagram of another embodiment of the present invention. In this embodiment, a button or other activation device 700 is placed on a smart card 710. The smart card 710 contains components similar to the bio-metric smart card 210, including a microprocessor, 716, battery 714, ROM 722, and display 720. Also similar to the bio-metric smart card, other arrangements of these components may also be utilized. The battery 214 provides an energy source for operation of the microprocessor 216. Alternatively, a solar or light sensitive panel provides the energy source.

The button or other activation device 700 provides a signal that initiates production of an encrypted key that is displayed on display 720. The button 700 may be a physical button having contacts, a pressure sensitive or light sensitive switch, a heat sensitive button, or another activation device. The display 720 may be an LCD device (including displays similar to palm-type computers, but adjusted for size to fit the credit card like dimensions of the smart card 710). The ROM 222 contains programming or other data executed/used by the microprocessor to calculate the encrypted key to be displayed. The programming stored in ROM 722 is executed on the microprocessor 716 (In one alternative, the programming is hardwired into other electronics of the smart card). The microprocessor receives the initiation signal from the button 700, calculates the encrypted key, and then displays the encrypted key on display 720.

Figure 8:
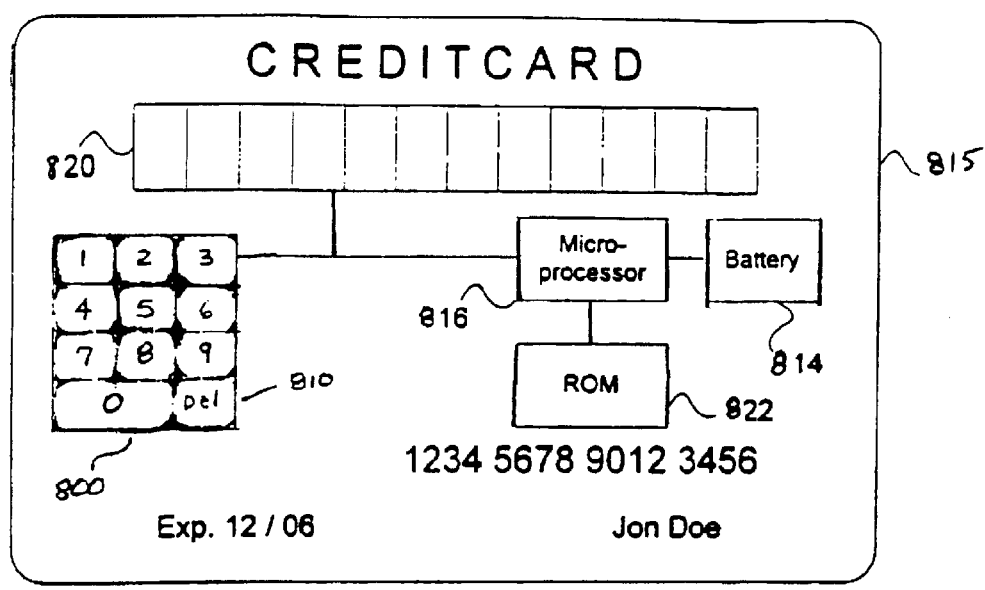
FIG. 8 is a diagram of another embodiment of the present invention having a touchpad for entry of a user PIN.

FIG. 8 is a diagram of another embodiment of the present invention. In FIG. 8, a touchpad 800 is provided for entry of a user PIN. The touchpad is a 10 key type touch pad having buttons for digits 0–1, and a delete button 810. Alternatively, the touchpad might also contain alpha numerals in various forms including telephone style numerals, shift key and shift key activate numerals, or a full keyboard. The touchpad may be constructed of a set of heat or pressure sensitive switches or other devices. The touch pad may be activated by finger touching the corresponding keys of the user's pin, or, via a stylus device.

In one alternative, both the display and keypad are consolidated on a single touch sensitive screen that has facilities for inputting numerals, alpha, and/or other characters consistent with a user's PIN (including, but not limited to symbols, punctuation, and/or foreign language alpha and characters). Handwriting recognition or a displayed keyboard similar to those found on Palm and Handspring devices may be utilized to input the user's PIN. Additional programming stored in ROM 822 and executed on Microprocessor 816 may be utilized to facilitate entry of the PIN. The additional programming may alternatively be embedded in the microprocessor or other electronics of the smart card.

In the embodiment of FIG. 8, the encrypted key is produced upon entry of the user's PIN to the smart card.

Figure 9:
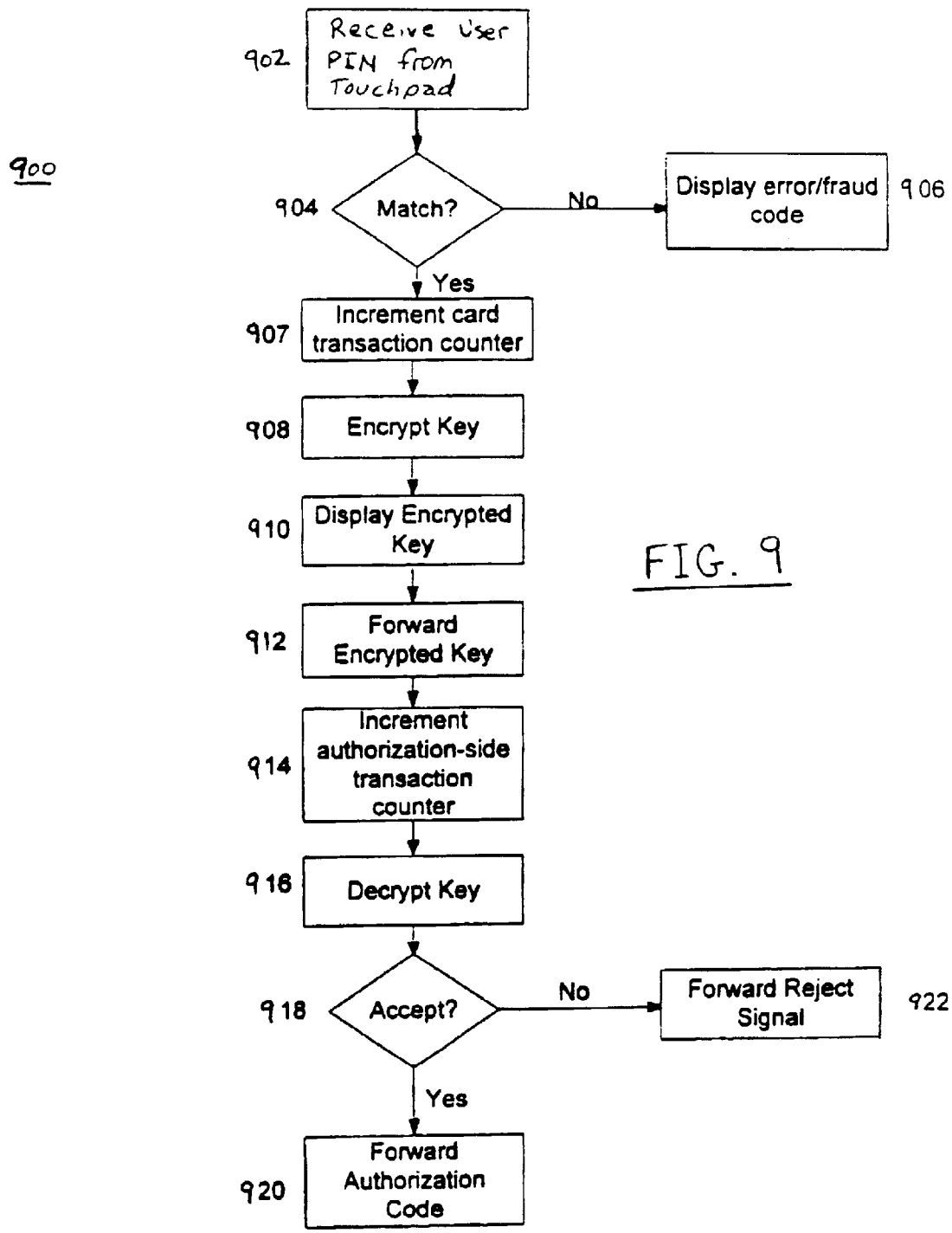
FIG. 9 is a flow chart illustrating operation of a touchpad embodiment of the present invention.

FIG. 9 is a flow chart illustrating operation of a touchpad embodiment of the present invention. At step 902 the microprocessor (e.g. microprocessor 716/1016) receives a user's PIN that had been entered by the user (e.g., via touchpad 800). The entered PIN is then compared, at step 904, against a stored PIN (e.g., stored in ROM 822) to determine is a match has occurred.

If a match does not occur, an error message or other message indicating an attempted use by other than the authorized user is forwarded at step 906 to the display. The displayed message (e.g., an error code) might indicate to the user that an error has been detected with an easily discernable message such as "ERR," or might make such a message recognizable only to the seller, bank or authorization service to better provide an opportunity to recapture a stolen card or detain an unauthorized user.

If a match is found at step 904, the microprocessor increments an activation/transaction counter at step 907 and generates therewith a numeric or alphanumeric security key. The alphanumeric security key is then preferably encrypted at step 908 and forwarded at step 910 to the display. The operator of a card reader 230, or a remote seller communicating with the user, then inputs or forwards at step 912 the displayed, encrypted security key along with the other information found on the surface of the smart card and/or any other required information.

Upon receipt of the card information and encrypted key at an authorization service center, an authorization-side activation counter is then incremented at step 914, thereby remaining synchronized to an activation counter of the smart card. The key is then decrypted at steps 916 in a manner utilizing the incremented activation count to determine at step 918 whether the authorized user initiated the requested purchase authorization. If the activation counter is sufficiently aligned with the counter reading from the card (within an allowed "window" of transaction counter numbers to allow for transactions being processed slightly out of order) and other easily understood criteria are met (i.e., sufficient credit or funds available, no lost or stolen card alert reported), an authorization signal is returned across network 125 at step 920. If any of the new or available criteria are not met, a "transaction rejected" code or signal is returned at step 922.

In one embodiment, the smart card uses both a bio-metric reading apparatus and a touchpad for entry of the user's PIN. Steps 902 and 904, and Steps 302 and 304 are each executed before performing other steps related to production/determination of the encrypted key.

Figure 10:
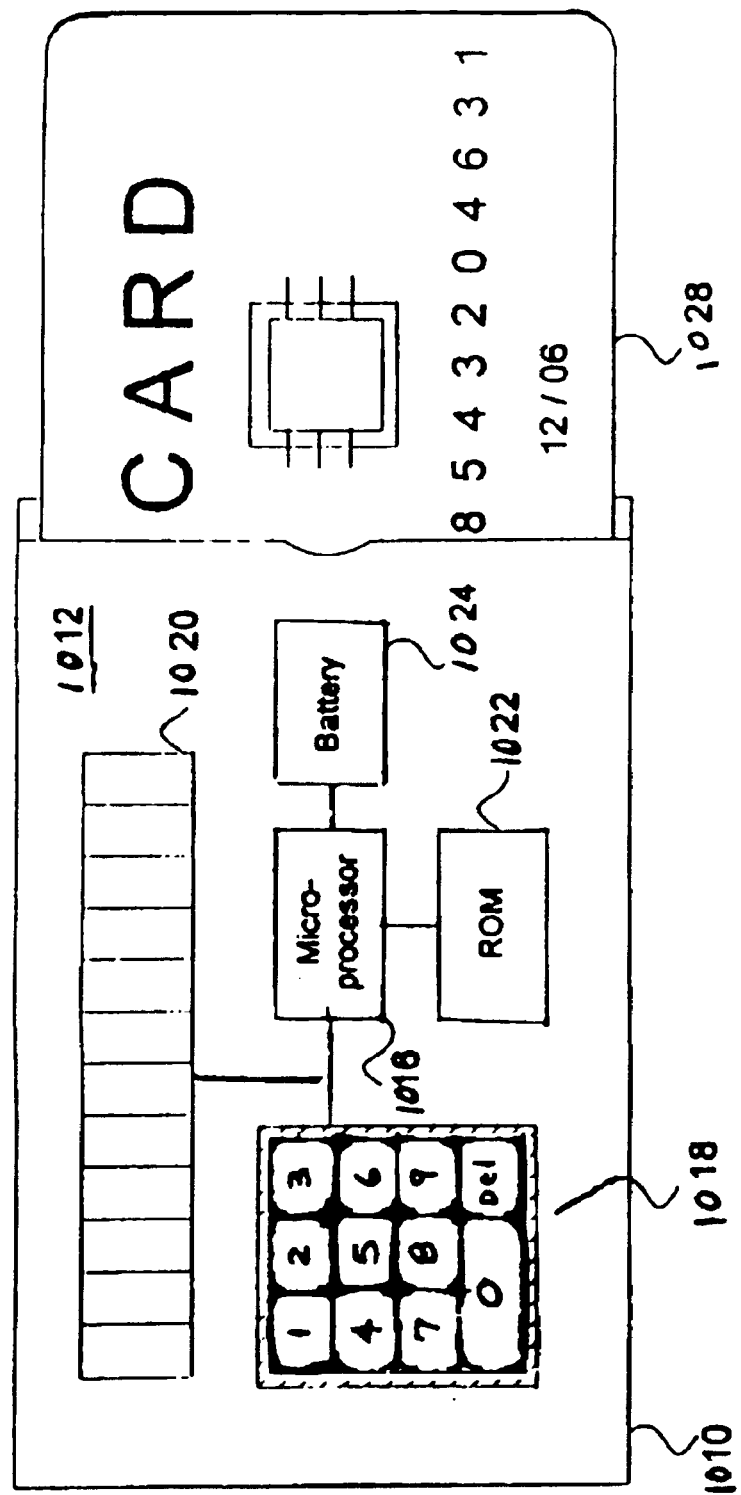
FIG. 10 is a diagram of yet another embodiment of the present invention.

FIG. 10 is a diagram of yet another embodiment of the present invention formed in conjunction with an alternative device. In this example alternative embodiment, the present invention is embedded and placed upon an alternative device, a wallet, 1010. The wallet 1010 preferably has substantially the same shape and form factor as available plastic credit and debit cards such as card 110 in FIG. 1, although it is generally thicker to accommodate the additional components. A smart card, credit card, or other device 1028 may be fitted and held inside the wallet 1010. On the front surface 1012, there is provided a touchpad 1018 for entry of a user's PIN (or alternatively, both a touchpad and bio-metric sensing device). The touchpad and/or bio-metric sensing device is in electrical communication with a microprocessor 1016. A ROM 1022, preferably an EEPROM, stores at least one of the fingerprint or other bio-metric data, the encryption keys, a transaction counter, and a user's PIN, as required to test inputs (either bio-metric or PINs) and produce an encrypted key. A battery 1024 may also be connected to provide power to microprocessor 1016. Again, the power may be provided through movement, solar cells, or other energy sources. The card reader includes a display 1020.

Processing performed by the embodiment of FIG. 10 may be performed similarly to any one of the other above described embodiments. The wallet 1010 includes an IR or other wireless transmitter to automatically transmit the security code to a transaction network. Thus, the present biometric reader ("wallet") may be used with existing smart cards, which lack an incorporated microprocessor and/or display.

In yet another embodiment of the present invention, a clocking mechanism 1100 (see FIG. 7) is coupled to the microprocessor (e.g., microprocessor 716). The clocking mechanism (preferably internal to the smart card, e.g. smart card 710) continually generates a clock authorization number. Programming executed on the microprocessor (e.g., microprocessor 716) uses the clock authorization number in production of the encrypted key. On the Card Authorization Server (CAS) (e.g., CAS 604, back end server, etc.), another clocking mechanism 1150 (See FIG. 6) is synched to the clocking mechanism 1100, and, an output of the synched clocking mechanism 1150 is used to decrypt the encrypted key. The decrypted key is then examined to verify that a proper transaction has been initiated. In one embodiment, the clocking mechanisms are clocks based on current time, and the clock authorization number is a value produced via an algorithm using the time and a clock authorization key. In another embodiment, the clocking mechanisms are unrelated to the current time, but progressively changes values in at least one direction (for example, any combination of count-up, count-down devices, or other time varying devices), and preferably encrypted with the clock authorization key. Use of internal clocks in producing the key, and hence the encrypted key, on both the device (e.g. smart card) and back end (e.g. CAS server) may be utilized in any of the other embodiments discussed further above.

The present inventors have realized that the present invention may integrated into existing credit card approval infrastructure. Most credit card approval systems today include a card reader (e.g. reader 120) which includes a keypad. Software operating the reader generally already has facilities for entry of a PIN, particularly for ATM card transactions that require a PIN. The present invention may be integrated into the existing infrastructure by using the existing software and prompts for collection of ATM PINs for collection and transfer of the encrypted key to a clearing house or other financial institution that approves use of the credit card. Transfer of the encrypted key is performed via a transaction communication in which the encrypted key is passed to the authorizing authority in the PIN field. Other data may also be communicated in the transaction communication.

Figure 11:
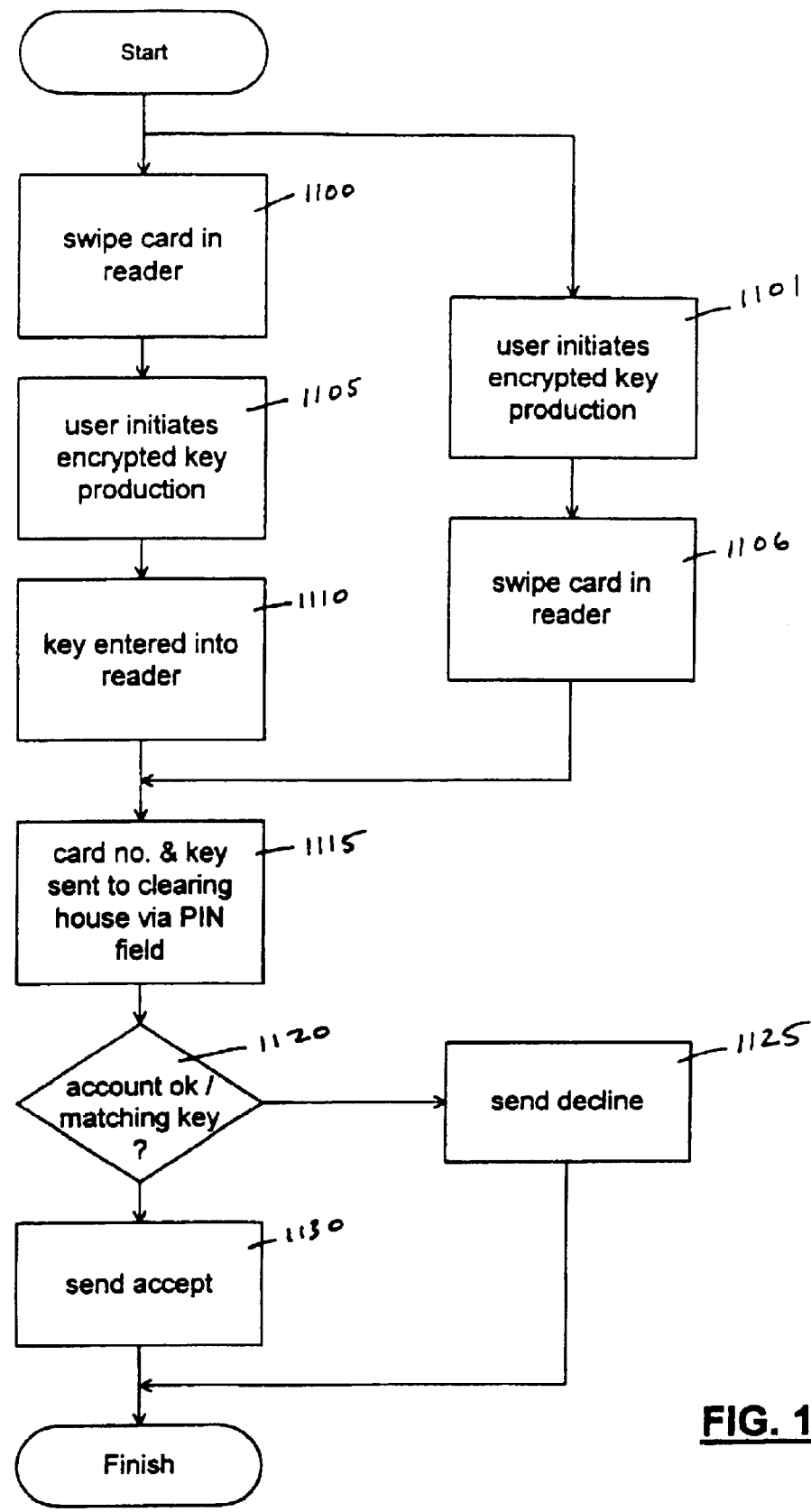
FIG. 11 is a flow chart illustrating an example process flow of implementing data transfer according to an embodiment of the present invention.

FIG. 11 is a flow chart illustrating an example process flow of implementing data transfer according to an embodiment of the present invention. Initially, at step 1100, the user swipes a credit card or otherwise enters the credit card number into a card reader, web page, or other device that captures the user's credit card number. At step 1105, the user initiates production of the encrypted key. The encrypted key is initiated according to any of the embodiments discussed above, pressing a button, entering a user PIN, or generated according to another triggering event (e.g., reading the card). Then, at step 1110, the user also enters the encrypted key into the reader when prompted. The prompt may simply be to enter the user's PIN, to which the user responds by entering the encrypted key generated by the smart card (not the user's PIN, which, in the previously discussed embodiments is required for production of the encrypted key). In essence, entry of the encrypted key is entry of the user's PIN for the transaction being processed.

The users card number and encrypted key may be entered into the system via other procedures. In one alternative, at step 1101, the user initiates production of the encrypted key. At step 1106, the user swipes his card into the card reader which then reads both the card number and encrypted key. The alternative procedures may not fit as easily into the existing infrastructures and may require some reprogramming of current readers. However, preferably, in any of the above embodiments, the encrypted key is entered into the system and placed in the existing PIN field of the data transaction between the card reader (e.g. retailer) and the first clearing house in the credit card transaction approval chain.

The users card number and encrypted key, along with other necessary information (e.g., cost of transaction, etc.) are then sent via a transaction communication to a clearing house or other financial institution for processing (Step 1115). A return message from the financial institution/clearing house indicates whether the transaction is approved (i.e., the account is in good standing and the encrypted key matches). If approved, an accept message is sent to the retailer (step 1130), if declined, the disapproval is sent to the retailer (step 1125).

Figure 12A:
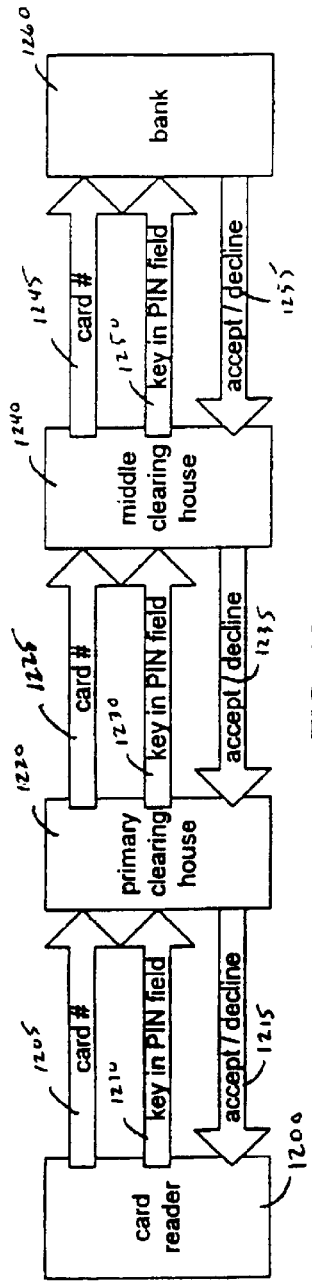
FIG. 12A is a block diagram illustrating an example data flow according to an embodiment of the present invention.

FIG. 12A is a block diagram illustrating an example data flow according to an embodiment of the present invention. FIG. 12A presents an example credit card transaction approval chain. In this example, the card number (card #) 1205 and other transaction data (price, etc) and the encrypted key (preferably placed in the PIN field) 1210 are sent to a primary clearing house. The primary clearing house is the first financial institution in the credit card transaction clearing house chain. The combined fields 1205 and 1210 comprise a transaction communication and may be a single message or multiple messages containing information needed to complete a transaction.

The primary clearing house checks the transaction like a normal credit card transaction and passes all the data (e.g. 1205/1210, now 1225/1230) to a middle clearing house 1240. The middle clearing house 1240 represents all the intermediary financial institutions between the primary clearing house and the banks or backing institution 1260 of the credit card (smart card). The middle clearing house also passes all the data on to the bank 1260. The bank 1260 then checks the account status, decrypts the encrypted key, and sends a status message 1255 back through the credit card transaction approval chain. If the account and key check out ok, the status message is an accept. If not, the status message is a decline.

Figure 12B:
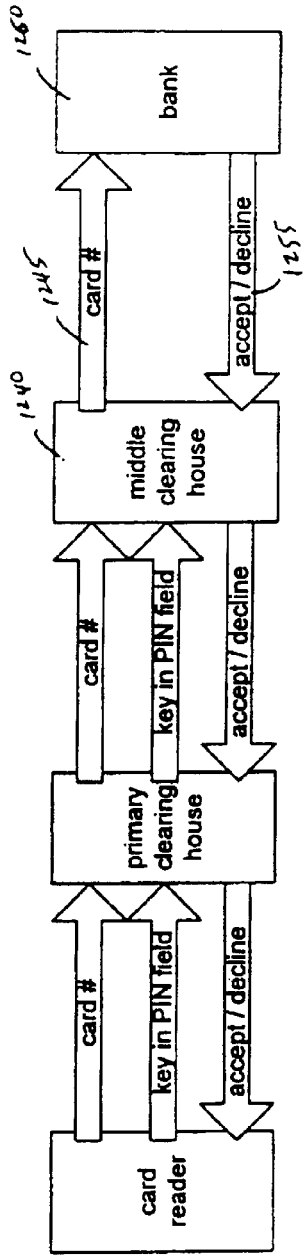
FIG. 12B is a block diagram illustrating an example data flow according to an embodiment of the present invention.
Figure 12C:
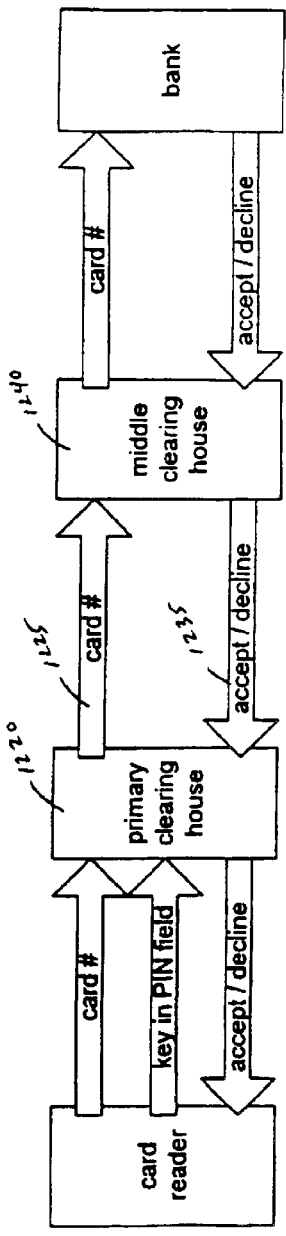
FIG. 12C is a block diagram illustrating an example data flow according to an embodiment of the present invention.

Therefore, the bank 1260 performs the primary financial and account checking to verify and approve the transaction. However, any of the primary and middle clearing houses may also perform similar functions. If this occurs, then the data flow through the credit card transaction approval chain may be modified accordingly. For example, in FIG. 12B, the middle clearing house 1240 decrypts the encrypted key and checks it for validity. The credit card number is still passed on to the bank 1260 for account validation. In yet another alternative, referring to FIG. 12C, the primary clearing house decrypts the encrypted key and checks it for validity. The credit card number is still passed on to the middle clearing house and bank 1260 for account validation. Any number of variations of checking and approval may be implemented once the card number, other transaction data, and the encrypted key are entered into the data communications representing the transaction to be approved.

Figure 13:
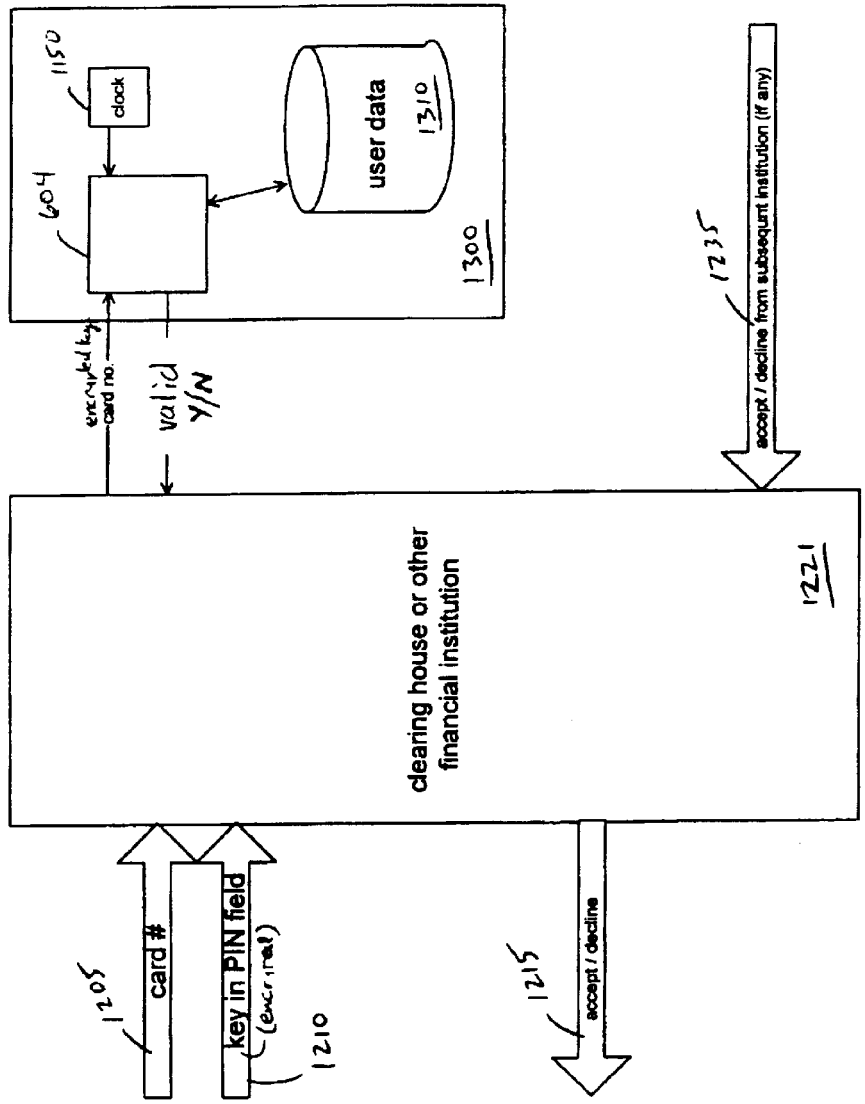
FIG. 13 is a block diagram illustrating an example data flow and data validation according to an embodiment of the present invention.

FIG. 13 is a block diagram illustrating an example data flow and data validation according to an embodiment of the present invention. In this example, a primary clearing house 1221 receives the card # and other transaction data 1205 and an encrypted key packed in a PIN field. The clearing house sends the card number to an authorization device 1300 that include authorization server 604. The authorization server 604 uses the card number to reference any needed user data 1310, retrieves a clock signal (if needed for the particular embodiment), decrypts the encrypted key, and determines if it is valid. If the decrypted key is valid, and an accept status signal 1235 is received from the subsequent institution (e.g., bank, credit union, etc.), then the clearing house 1221 forward an accept status 1215. If either the decrypted key is invalid, or a decline is received in status 1235, the clearing house forwards a decline in status message 1215.

In one embodiment, the smart card of the present invention is produced on an Electronic Ink surface such as a Thin and Flexible Microelectronics (TFM) substrate. Example surfaces are produced by Power Paper™.

Figure 14A:
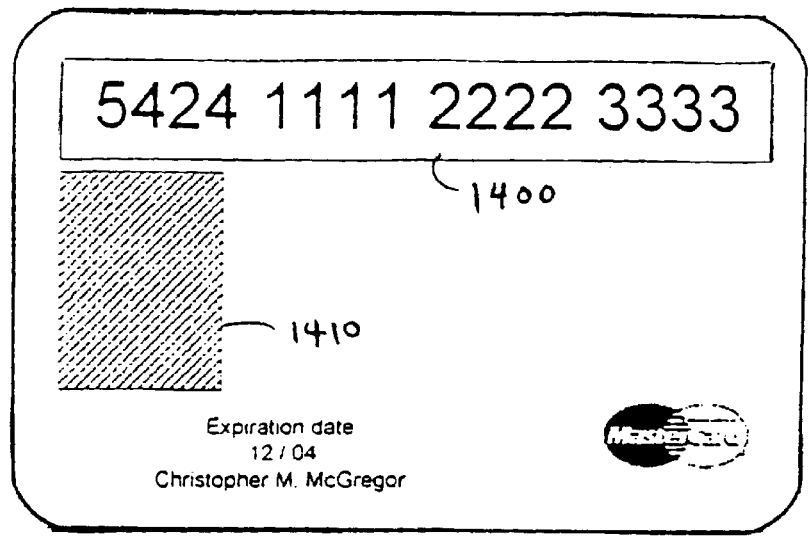
FIG. 14A is an example embodiment of the present invention having a surface of the smart card coated in digital ink.
Figure 14B:
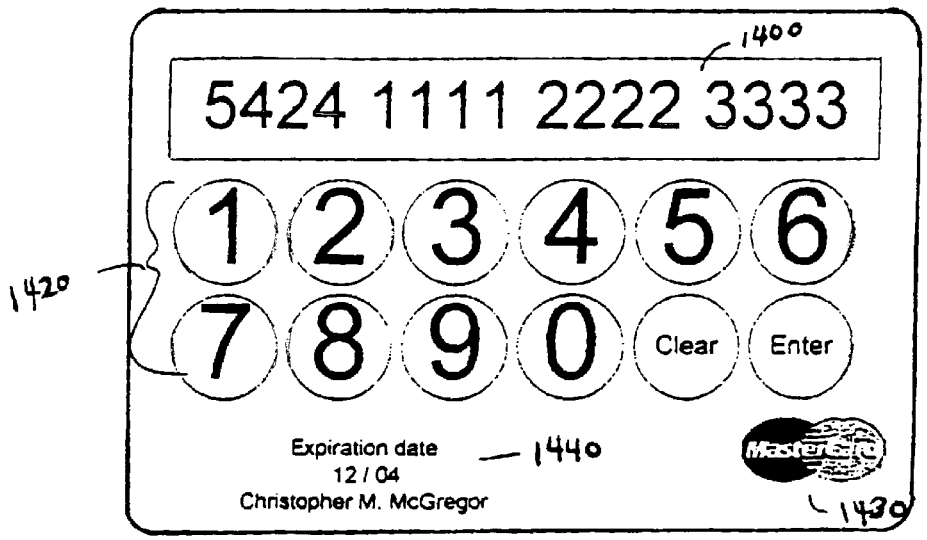
FIG. 14B is another example embodiment of the present invention having a surface of the smart card coated in digital ink.

The principal components of electronic ink are millions of tiny microcapsules, about the diameter of a human hair. In one incarnation, each microcapsule contains positively charged white particles and negatively charged black particles suspended in a clear fluid. When a negative electric field is applied, the white particles move to the top of the microcapsule where they become visible to the user. This makes the surface appear white at that spot. At the same time, an opposite electric field pulls the black particles to the bottom of the microcapsules where they are hidden. By reversing this process, the black particles appear at the top of the capsule, which now makes the surface appear dark at that spot. To form an E Ink electronic display, the ink is printed onto a sheet of plastic film that is laminated to a layer of circuitry. The circuitry forms a pattern of pixels that can then be controlled by a display driver. These microcapsules are suspended in a liquid "carrier medium" allowing them to be printed using existing screen printing processes onto virtually any surface, including glass, plastic, fabric and even paper. In the present invention, microprocessor 716 (or other electronics connected thereto) include drivers that charge the electronic circuitry that to form the pattern of pixels for the display on the smart card 710 or smart card wallet 1010. In this embodiment, the LCD display 720, 820, and 1020 is replaced with an electronic ink surface. Any display imaginable may be produced. Some example displays include those presented previously, and alternatives may include those shown in FIGS. 14A and 14B. Each of FIGS. 14A and 14B represent an entire surface of the smart card coated in digital ink. A card number space 1400 is provided. In one embodiment, a logo space 1410 is provided, and programming of the microprocessor and/or display drivers produces a logo of the card or backing financial institution displayed in the logo space 1410. In FIG. 14B, a keypad including digits 1–9, 0, clear, and enter are provided in digital ink. Underlying electronics, including any of heat sensitive, pressure sensitive, or mechanical activation switches are provided to register user inputs on the key pad. Logo space 1430 is a digital ink representation of the credit card company, and expiration date/user information is provided in space 1440.

Portions of the present invention may be conveniently implemented using a conventional general purpose or a specialized digital computer or microprocessor programmed according to the teachings of the present disclosure, as will be apparent to those skilled in the computer art. Preferably, that computer is embodied in a microprocessor embedded in a wallet or smart card device.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, retrieval of user inputs including bio-metric data, PIN numbers, PIN number and/or bio-metric data comparisons, operation of counters, encryption/decryption routines, transmitting and receiving any of IR, RF, or other electronic or optical signals, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A system for securely processing transactions, the system comprising:
   a security key device, comprising,
      a user authenticator configured to provide a user an authentication data input for proving the user is authorized to use an account associated with the security device,
      a first counter in communication with the user authenticator,
      a key generator in communication with the user authenticator and first counter, the key generator being programmed to generate a security key in response to authentication data received via the user authenticator, the security key being derived at least in part from contents of the first counter, and
      an electronic display in electrical communication with the key generator, for displaying the security key in a manner visible upon the structure; and
   an authorization device, comprising,
      a second counter, and
      a key confirmation processor programmed to confirm an authenticity of the security key in a manner at least partially dependent upon the contents of the second counter
   wherein the security key is derived at least partially from the contents of the first counter,
   wherein the key confirmation processor approves a transaction if the contents of the first counter matches contents of the second counter within a predetermined range.

2. A system for securely processing transactions, the system comprising:
   a security key device, comprising,
      a user authenticator configured to provide a user an authentication data input for proving the user is authorized to use an account associated with the security device,
      a first counter in communication with the user authenticator,
      a key generator in communication with the user authenticator and first counter, the key generator being programmed to generate a security key in response to authentication data received via the user authenticator, the security key being derived at least in part from contents of the first counter, and
      an electronic display in electrical communication with the key generator, for displaying the security key in a manner visible upon the structure; and
   an authorization device, comprising,
      a second counter, and
      a key confirmation processor programmed to confirm an authenticity of the security key in a manner at least partially dependent upon the contents of the second counter, wherein:
   the security key device further comprises a first clocking mechanism having an output coupled to the key generator, and the key generator programming includes use of the clocking mechanism output to generate the security key;
   the authorization device further comprises a second clocking mechanism synchronized to the first clocking mechanism, and a second counter; and
   the key confirmation processor is programmed to confirm an authenticity of the key in a manner at least partially dependent upon the contents of the second counter and an output of the second clocking mechanism.

3. The system according to claim 2, wherein the clocking mechanisms are based on a time variant device.

4. The system according to claim 2, wherein said clocking mechanisms are based on actual time.

5. A method of securely authorizing a transaction utilizing an account, the method comprising:
   confirming an authorized use of an account card via a PIN provided by a user;
   maintaining a first count indicative of a number of instances of such authorized uses;
   generating a security key in a manner at least partially dependent upon the count;
   transmitting the security key to an authorizing authority;

processing the security key at the authorizing authority;

maintaining a second count indicative of a number of transmissions received by the authorizing authority for the account;

confirming that the security key was generated by an authorized user at least in part through use of the second count;

authorizing the transaction if the security key was generated by an authorized user, wherein the security key is generated using an encryption algorithm to process a card key and the first count, wherein the transaction is authorized if the first count is within a predefined number of the second count, further comprising the step of:

maintaining first and second clocking devices configured to respectively produce first and second clock signals;

wherein:

said step of generating a security key comprises generating a security key in a manner at least partially dependent upon the count and the first clocking device; and said step of confirming the security key comprises confirming that the security key was generated by an authorized user at least in part through use of the second count and the second clock signal.

6. A smart card, comprising, an activation device configured to produce a signal in response to a user action;

a display mechanism;

a processing device coupled to the display device and configured to receive said signal; and programming executable by the processing device upon receipt of said signal and configured to produce an encrypted key and display the encrypted key on the display mechanism;

wherein:

said smart card comprises a credit card sized enclosure;

said display mechanism is disposed on a face of the credit card sized enclosure;

said programming is stored on a computer readable media disposed on or within the credit card sized enclosure;

said credit card sized enclosure in a solid flexible material;

said activation device is a numeric entry system disposed on a face of the credit card sized enclosure;

said numeric entry system includes a ten key type entry system and said user action is entry of a PIN via the numeric entry system;

said programming is further configured to verify said user action prior to displaying the encrypted key;

if said programming is unable to verify said user action, then, displaying one of an error message and a non-authentic value on the display mechanism;

said smart card further comprises a bio-metric sensing device coupled to said processing device;

said programming is further configured to retrieve a bio-metric input from said bio-metric sensing device and compare the bio-metric input to a stored bio-metric value prior to one of calculating and displaying the encrypted key, said bio-metric sensing device is a fingerprint scanner;

said smart card further comprises a transaction counter configured to track authorized transactions associated with the smart card and a clocking mechanism configured to produce a time varying clock value;

said encrypted key is derived, at least in part, based on the transaction counter and time varying clock value; and said smart card is capable of communicating with an authorization device that, retrieves the encrypted key from a PIN field of a transaction communication, decrypts the encrypted key using a count from a second transaction counter and a second time varying clock value from a second clocking mechanism synchronized with the first clocking mechanism, and authorizes a transaction if the decrypted key is valid;

the decrypted key being valid if produced by the smart card with a valid PIN and the first and second transaction counters are synchronized within a predetermined number of transactions.

* * * * *